(12) United States Patent
Ahdoot

(10) Patent No.: US 10,619,812 B2
(45) Date of Patent: Apr. 14, 2020

(54) LIGHT COLLECTION DEVICE

(71) Applicant: BIGZ TECH INC., Saint-Laurent (CA)

(72) Inventor: Eliot Ahdoot, Dollard-des-Ormeaux (CA)

(73) Assignee: BIGZ TECH INC., Saint-Laurent (CA)

( * ) Notice: Subject to any disclaimer, the term of this patent is extended or adjusted under 35 U.S.C. 154(b) by 0 days.

(21) Appl. No.: 16/316,976

(22) PCT Filed: Aug. 14, 2017

(86) PCT No.: PCT/CA2017/050961
§ 371 (c)(1),
(2) Date: Jan. 10, 2019

(87) PCT Pub. No.: WO2018/027331
PCT Pub. Date: Feb. 15, 2018

(65) Prior Publication Data
US 2019/0293252 A1 Sep. 26, 2019

Related U.S. Application Data

(60) Provisional application No. 62/374,112, filed on Aug. 12, 2016.

(51) Int. Cl.
*F21S 11/00* (2006.01)
*G02B 19/00* (2006.01)
(Continued)

(52) U.S. Cl.
CPC ............ *F21S 11/002* (2013.01); *F21S 11/00* (2013.01); *G02B 19/0028* (2013.01);
(Continued)

(58) Field of Classification Search
CPC ................ F21S 11/002; F24S 30/00
(Continued)

(56) References Cited

U.S. PATENT DOCUMENTS 4,282,858 A  8/1981 Bowers, Jr.
4,389,085 A * 6/1983 Mori ................. F21S 11/00
359/591

(Continued)

FOREIGN PATENT DOCUMENTS

CN  101702599  5/2010
KR  10-1674042  * 11/2016  ............ F21S 11/002

OTHER PUBLICATIONS

Patrick, Abou-Antoun, International Search Report PCT/CA2017/050961. Form PCT/ISA/210, dated Nov. 14, 2017, 3 pages.
(Continued)

*Primary Examiner* — Christopher E Mahoney
(74) *Attorney, Agent, or Firm* — Benoit & Cote, Inc.; C. Marc Benoit

(57) ABSTRACT

There is provided a light collecting device comprising a concave portion for receiving incoming light. The concave portion comprises a reflective inner surface for directing at least partly the incoming light toward a focal spot, which is defined by a geometry of the concave portion. A light guide holder is held in place at the focal spot and holds a light-receiving end of a light guide, inside its annular shape. It holds the light-receiving end toward the concave portion to substantially capture the incoming light directed toward the focal spot. The concave portion can be a dish or a lamp reflector. The light guide holder can be held in place by arms having pads that rest on or hold the concave portion.

18 Claims, 9 Drawing Sheets

(51) Int. Cl.
*H02S 20/23* (2014.01)
*H02S 40/22* (2014.01)

(52) U.S. Cl.
CPC .......... *G02B 19/0042* (2013.01); *H02S 20/23* (2014.12); *H02S 40/22* (2014.12); *Y02B 10/20* (2013.01); *Y02E 10/52* (2013.01)

(58) Field of Classification Search
USPC ........................................................ 359/593
See application file for complete search history.

(56) References Cited

U.S. PATENT DOCUMENTS

| | | | |
|---|---|---|---|
| 4,394,860 A * | 7/1983 | Smith | F24S 23/00 126/685 |
| 4,483,311 A | 11/1984 | Whitaker | |
| 4,529,830 A | 7/1985 | Daniel | |
| 4,723,826 A | 2/1988 | Whitaker | |
| 4,740,048 A * | 4/1988 | Mori | A01G 7/045 359/592 |
| 5,521,725 A | 5/1996 | Beeson et al. | |
| 6,541,694 B2 | 4/2003 | Winston et al. | |
| 7,295,372 B2 | 11/2007 | Steneby | |
| 7,873,257 B2 | 1/2011 | Morgan | |
| 8,068,282 B1 | 11/2011 | Kastner et al. | |
| 8,165,435 B2 | 4/2012 | Martin-Lopez | |
| 8,339,709 B1 | 12/2012 | Gu | |
| 2002/0062856 A1 | 5/2002 | Wescott | |
| 2005/0274407 A1 | 12/2005 | Curry | |
| 2010/0089436 A1 | 4/2010 | Watters | |
| 2010/0091396 A1* | 4/2010 | Hutson | F21S 11/00 359/859 |
| 2010/0269817 A1 | 10/2010 | Kelly | |
| 2011/0226311 A1* | 9/2011 | Sun | F21S 11/002 136/247 |
| 2012/0033919 A1* | 2/2012 | Calac | G02B 6/245 385/76 |
| 2014/0261622 A1 | 9/2014 | Floyd et al. | |
| 2015/0009567 A1 | 1/2015 | Freier et al. | |
| 2015/0370054 A1* | 12/2015 | Becker | H02S 20/32 136/259 |

OTHER PUBLICATIONS

UC's SmartLight More Than a Bright Idea, It's a Revolution in Interior Lighting Ready to Shine. URL: https://www.uc.edu/news/articles/legacy/enews/2013/11/e18752.html.
Innovative-daylighting-system-incorporating-active-light-collection. URL: http://sbsp.ubc.ca/2015/02/05/an-innovative-daylighting-system-incorporating-active-light-collection/.
Exhaustive review of light tubes. URL: https://en.wikipedia.org/wiki/Light_tube.

* cited by examiner

LIGHT COLLECTION DEVICE

BACKGROUND

(a) Field

The subject matter disclosed generally relates to light collectors. More specifically, it relates to light collectors for the redirection of sunlight.

(b) Related Prior Art

Sunlight is an abundant source of energy. The ability to harvest sunlight, either for direct use of light or for conversion into another form of energy, is useful many purposes.

The building industry is making attempts to embrace solar energy through a variety of means. Direct use of sunlight at appropriate moments of the day is permitted by architectural changes to buildings which allow sunlight to fill the interior spaces of buildings to replace electrical lighting, while preventing too much sunlight to enter the building when the inside temperature is too high, for example. Practically, it involves building very large and high windows and adding architectural shades above the windows to block midday sunlight.

Rooftops of buildings are also evolving over time, as buildings get adapted for the installation of solar panels on top of them. These solar panels can be photovoltaic cells that convert sunlight into electric power, or solar thermal panels that collect heat from the radiation for heating water, for example.

Retrofitting existing buildings in order to meet such needs can be difficult. Changing the location of windows on a building would be very costly, while changing the orientation of a building to modify its exposure to sunlight is impossible. Modifying architectural elements of the building to integrate potentially advantageous solutions that let more sunlight in while blocking midday or afternoon sunlight may not be feasible or may be impractical from an architectural point of view.

Furthermore, the addition of solar panels on the rooftop requires the roof to have access for maintenance staff and available space for the solar panels, a requirement that is worsened by the fact solar panels are usually inclined (i.e., they require a greater surface area) and require space in-between for the circulation of maintenance staff. Moreover, the roof must be able to withstand the significant weight of the solar panels.

SUMMARY

According to an aspect of the invention, there is provided a light collecting device comprising:
   a concave portion for receiving incoming light and comprising a reflective inner surface for directing at least partly the incoming light toward a focal spot defined by a geometry of the concave portion;
   a light capturing element, located at the focal spot, and having a lightbulb shape to substantially capture the incoming light directed toward the focal spot and to reflect the incoming light within the light capturing element toward an exit thereof; and
   a light guide comprising an end provided at the exit of the light capturing element for guiding captured light outside of the light collecting device.

According to an embodiment, the light capturing element substantially has a lightbulb shape.

According to an embodiment, the light capturing element is transparent, wherein a refraction index of the light capturing element is in a range ensuring substantial total inner reflection in order to reflect the incoming light within the light capturing element toward the exit.

According to an embodiment, there is further provided a lens arrangement in front of the end of the light guide.

According to another aspect of the invention, there is provided a light collecting device comprising:
   a concave portion for receiving incoming light and comprising a reflective inner surface for directing at least partly the incoming light toward a focal spot defined by a geometry of the concave portion; and
   a light guide holder located at the focal spot for receiving a light-receiving end of a light guide, the light guide holder holding the light-receiving end toward the concave portion to substantially capture the incoming light directed toward the focal spot.

According to an embodiment, the concave portion comprises a dish.

According to an embodiment, the dish comprises a paraboloid.

According to an embodiment, the dish is held by brackets attached to an outer surface of the dish.

According to an embodiment, the brackets are held to a support by a configuration bracket, the configuration bracket being lockable in more than one orientation.

According to an embodiment, the light guide holder is held by arms which have pads to rest on or attach to the dish.

According to an embodiment, the reflective inner surface comprises a polished surface.

According to an embodiment, there is further provided the light guide.

According to an embodiment, there is further provided a lens arrangement in front of the light-receiving end of the light guide.

According to another aspect of the invention, there is provided a light collecting device comprising:
   a concave portion for receiving incoming light and comprising a reflective inner surface for directing at least partly the incoming light toward a focal spot defined by a geometry of the concave portion, the concave portion having an exit;
   a light reflecting element, located at the focal spot, to substantially reflect toward the exit the incoming light that is directed toward the focal spot; and
   a light guide comprising an end provided at the exit for guiding captured light outside of the light collecting device through the light guide.

According to an embodiment, the concave portion comprises a dish.

According to an embodiment, the dish comprises a paraboloid.

According to an embodiment, the dish is held by brackets holding an outer surface of the dish.

According to an embodiment, the brackets are held to a support by a configuration bracket, the configuration bracket being lockable in more than one orientation.

According to an embodiment, the reflective inner surface comprises a polished surface.

According to an embodiment, there is further provided a lens arrangement in front of the end of the light guide.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Referring to FIGS. 1A-1B, there are shown prior art systems for harnessing solar energy.

Figure 1:
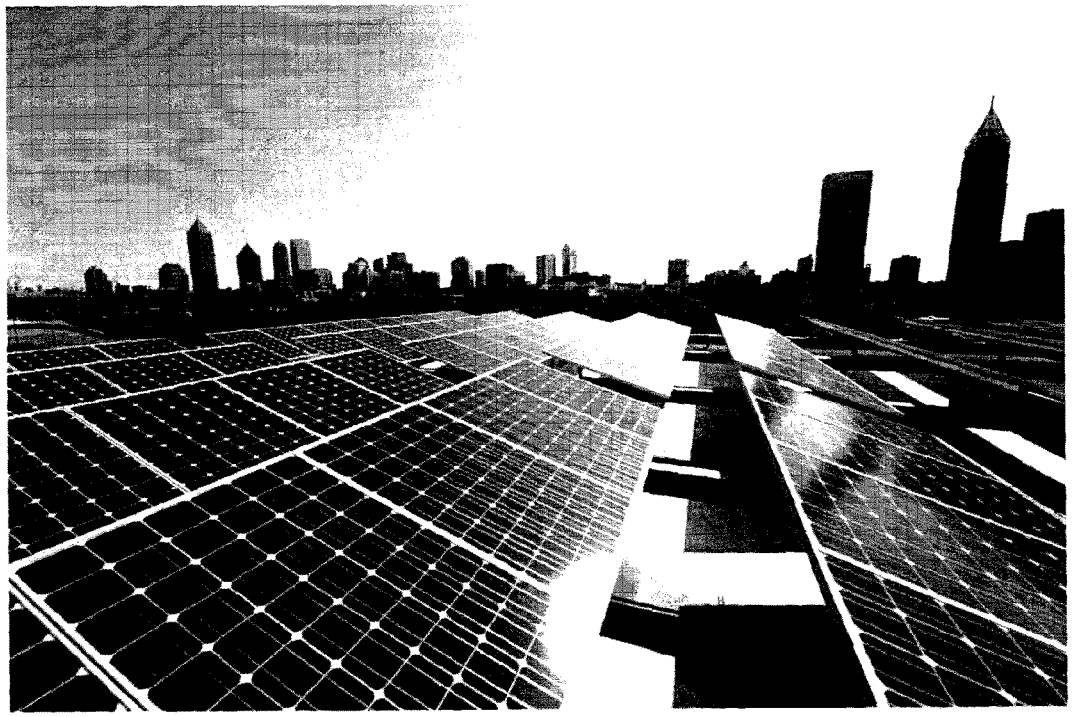
FIG. 1 is a picture illustrating a sunlight harnessing system, according to the prior art.

FIG. 1 is a picture of a real-life system comprising solar panels on the rooftop of a building. On the picture, it is apparent that the real-life solar panels are bulky. The bulkiness is even worsened by the inclination of the solar panels, which is a common feature of solar panels installations in regions of middle to high latitude. A walkable surface for maintenance access is also shown in FIG. 1.

This configuration has been determined as requiring too much surface area on the rooftop, and requiring reinforcement of the rooftop structure. This is therefore not convenient, and retrofitting is hard and costly.

Figure 2A:
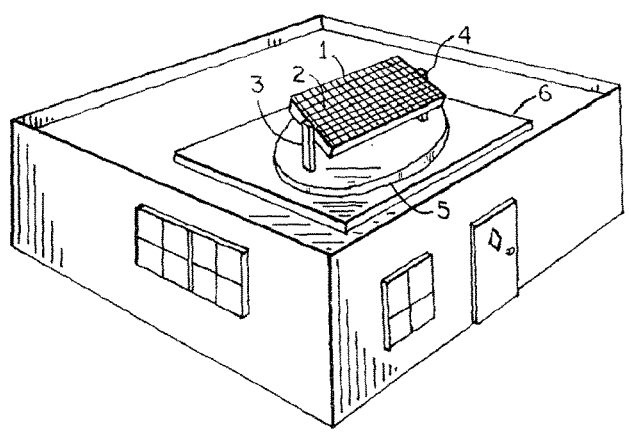
FIGS. 2A-2B are a perspective view and a cross-section illustrating a sunlight harnessing system with a light guide, according to the prior art.
Figure 2B:
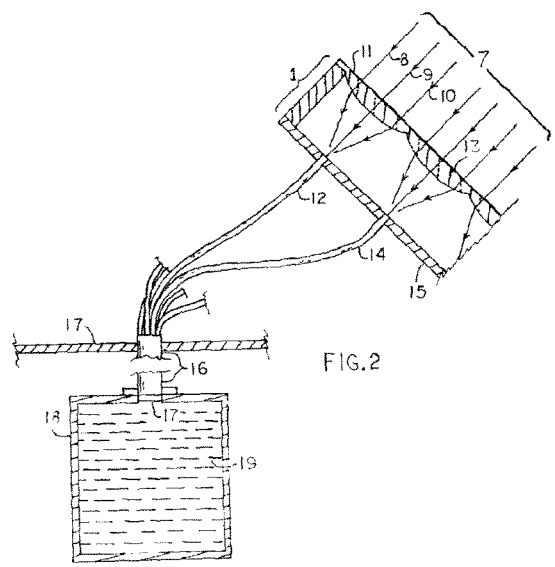

FIGS. 2A-2B illustrate a prior art system, as in U.S. Pat. No. 4,483,311, for collecting from the rooftop and transmit it into a building. Even though light is advantageously brought into the building, the equipment used for light collection is still bulky. The equipment occupies substantially significant surface area on the roof, while also weighting on the roof structure. Furthermore, it needs to be inclined and oriented toward the Sun for maximum light collection.

Figure 3:
FIG. 3 is a picture illustrating a perspective view of a light collector, according to an embodiment.

Referring to FIG. 3, there is shown an embodiment of a light collector 10.

The light collector 10 is designed to facilitate the retrofitting into existing buildings, i.e., the materials required to build the light collector 10 and its dimensions do not cause the light collector 10 to have excessive weight and many components are off-the-shelf components that may have been designed for other purposes but have been found to work well for the purpose contemplated herein. The light collector 10 can be fabricated in small-weight versions that can be installed on rooftops without alterations to the roof structure to improve the weight-supporting capacity. The light collector 10 does not need to be inclined in order to have a satisfying performance.

Furthermore, as will be realized below, the functionality of redirecting light rather than concentrating it allows for a greater versatility in the user of the light collector 10. The light collector 10 can be used in combination with various technologies of solar panels (e.g., photovoltaic, thermal, etc.), or can be used to transmit the light elsewhere in the building for lighting purposes, without any conversion.

The light collector 10 of FIG. 3 comprises a concave portion 15. The concave portion 15 has a bowl shape and defines an inner surface 16 and an outer surface 17. The inner surface 16 needs to be reflective.

To provide a reflective inner surface 16, a reflective coating, made of an optically-reflective material, can be provided on the inner surface 16. Since the concave portion 15 is intended to substantially focus light, i.e., to bring light toward an approximate location, a substantially specular reflection is preferred over diffuse reflection. Preferably, the optically-reflective material should be selected to meet this requirement.

The term "optically-reflective" is intended to mean that relevant wavelength ranges are substantially reflected. Different wavelength ranges are expected to be reflected with different efficiencies (i.e., different percentages of reflection). The percentage that is not reflected is usually absorbed by the inner surface 16; this situation is usually undesirable, and therefore higher percentages of reflection are most often desired.

In some circumstances, only certain/selected optical wavelengths are desired (for retransmission of sunlight for lighting purposes) while others are undesirable (e.g., infrared that only dissipate into heat). These other undesirable wavelength ranges, such as infrared radiations, can be substantially cut off by providing a reflective coating that substantially reflects optical wavelengths but not infrared radiations. This configuration removes the infrared radiations from the radiations transmitted into the building, thereby preventing a major cause of heating in the building.

It is also worth noting that a light guide 30 (see FIGS. 6, 7A and 7B) can be used for guiding the light collected by the light collector 10. The light guide 30 transmits light radiation on a certain distance, usually through a material. This material has optical properties including a coefficient of absorption, which is a function of the wavelength. Some wavelengths travel better than others (i.e., some wavelengths have higher percentages of transmission than others) in the light guide's material. The reflective properties of the inner surface 16 should therefore match the transmission properties of the light guide 30 to make sure that desirable wavelengths are both reflected in a suitably high percentage by the inner surface 16 and transmitted in a suitably high percentage by the light guide 30. If there are provided other optical parts (e.g., lenses, mirrors, couplers, multiplexers, etc.) with which light interacts, the same principle of consistency applies.

As mentioned above, the concave portion 15 is used to substantially focus light toward a given point or, more realistically, toward a spot. The concave portion 15 is concave because the concavity allows the focusing of incoming light. The concave portion 15 can have a paraboloid inner surface 16 (a paraboloid is the shape created by a rotating parabola), the optical properties of the paraboloid being known to those skilled in optical technologies. Most interestingly, light rays that are incoming in a line parallel with the axis of the paraboloid are focused to the focal point of the paraboloid. If light rays are not parallel to the axis, they end up being focused at other points which together define the focal plane of the paraboloid.

Figure 5:
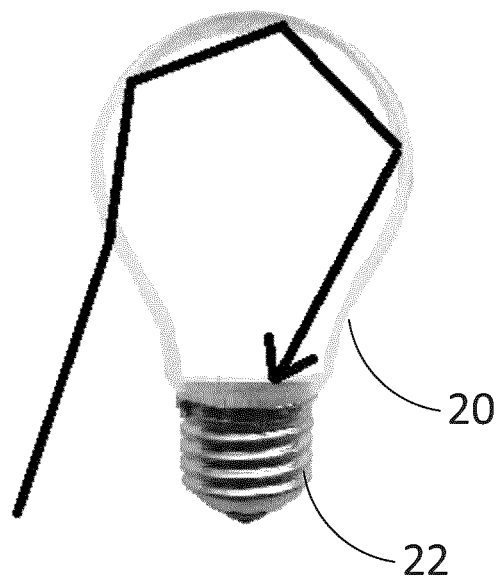
FIG. 5 is a side view illustrating a light capturing element with incoming light rays being reflected therein and captured, according to an embodiment.
Figure 6:
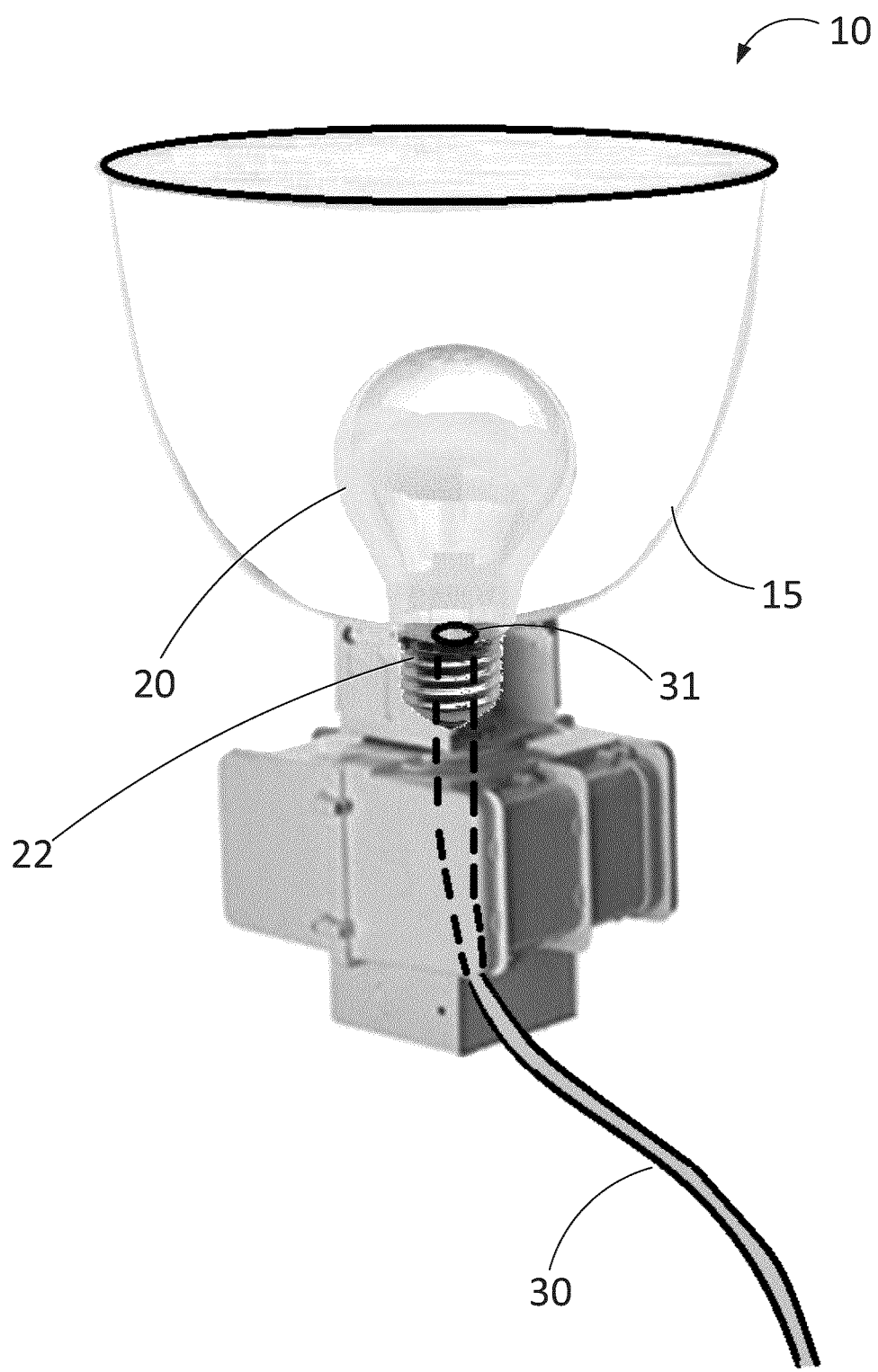
FIG. 6 is a side view illustrating a light collector with a light capturing element installed at a focal spot therein and a light guide extending therefrom, according to an embodiment.

A light capturing element 20, illustrated in FIG. 5, is provided within the concavity of the concave portion (or slightly outside thereof), at or closed to the focal point, as shown in FIG. 6. The light capturing element 20 occupies some volume in space (i.e., it is not a mere point) and therefore it occupies some space around the focal point. Preferably, the light capturing element 20 extends along some portion of the focal plane.

Figure 4:
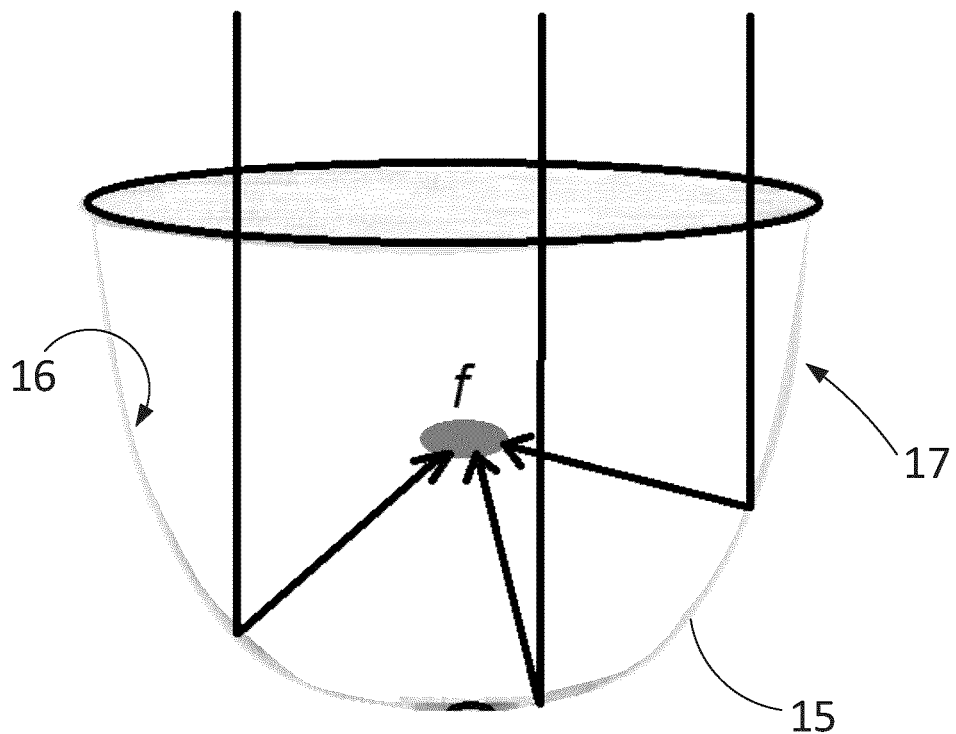
FIG. 4 is a cross-section illustrating a light collector with incoming light rays being reflected to a focal point, according to an embodiment.

Since the light capturing element 20 occupies some space, the geometrical reflection properties of the concave portion 15 do not need to be perfect. For example, the shape of the inside of the concave portion 15 can differ from a paraboloid. For example, semi-spherical mirrors do not focus perfectly; the incoming light rays are focused toward a region herein named the focal spot f (also known in photography as a circle of confusion or blur spot, or in telecommunications as a focal cloud). If the concave portion 15 looks grossly like a paraboloid (even though there are irregularities, imperfections or other concave shapes), some sort of focal spot usually exists. The focal sport f is shown in FIG. 4. The location in space of this focal spot is identified and the light capturing element 20 is provided at this location. Alternatively, the concave portion 15 can be only grossly or vaguely in a paraboloid shape and still define a focal spot f that is more extended in space but still suitable from bringing light into the light capturing element 20.

The light capturing element 20 needs to comprise a light transmitting surface, such as glass, in order to effectively capture incoming and focused light. A substantial ball shape is a suitable shape that occupies space around the focal sport and that can capture light.

According to an embodiment, the light capturing element 20 is the envelope of a light bulb (i.e., the glass forming the bulb), as shown in FIGS. 5-6.

The light capturing element 20 needs a support 22 so it can stand and remain at the desired location (the focal sport), which is usually a floating point above the exit (i.e., the bottom) of the concave portion 15. Strings or thin rods can be provided at an upper edge of the concave portion for holding the light capturing element 20 in suspension above the exit of the concave portion 15, at the focal spot.

In a preferred embodiment, the support 22 is a lightbulb socket, as shown in FIGS. 5-6. It means that the light capturing element 20 is a lightbulb having both the glass bulb and its supporting socket. In comparison with a standard lightbulb, this embodiment has the filament removed.

In this embodiment, the support 22, which is a lightbulb socket, can be screwed, mounted (e.g., using a bayonet mount), pinned, or otherwise held in place at the exit of the concave portion 15. A recess can be provided at the exit of the concave portion 15 for mounting the support 22. The length of the support 22 and/or of the light capturing element 20 should be adjusted or selected so that the light capturing element 20 is high enough to be located at the focal spot.

As shown in FIG. 5, the light capturing element 20 has a shape adapted for capturing or retaining incoming light rays. Light rays refract while entering the glass or other material forming the light capturing element 20. They refract again inside the light capturing element 20 (which is shown as being hollow, either with a vacuum inside or air). If the index of refraction of the glass or other material forming the light capturing element 20 is in the right range, e.g., in the range of indexes of refraction of glass, most of the light rays inside the light capturing element 20 undergo total internal reflection instead of transmission and refraction outside the light capturing element 20. If all interactions of the light rays inside the light capturing element 20 are total internal reflections, the light rays are captured inside the light capturing element 20. Some coatings, fillings and other materials with different indices of refraction can be added in the light capturing element 20 to ensure that the total internal reflections are occurring as needed.

When a light ray reaches the exit (i.e., the bottom) of the light capturing element 20, it can be collected by the light guide for transmission elsewhere. An example of a capture of a light ray is shown in FIG. 5.

By providing a light guide 30 such as an optical fiber that starts at the exit of the light capturing element 20, captured light rays can enter the light guide 30 by one of its ends and travel therethrough to another location, such as a location within the building. A light guide 30 extending from the exit of the light capturing element 20 and being routed out from the light collector 10 is shown in FIG. 6.

Optionally, a lens or lens arrangement 31 is provided in front of the light-receiving end of the light guide 30. The lens arrangement 31 therefore focuses the light from the light capturing element 20 toward the light-receiving end of the light guide 30.

The resulting light collector 10 is therefore very compact. It does not weigh more than small objects being brought up temporarily on a rooftop and therefore, no structural solidifications are required to install the light collector 10 on a building's rooftop.

Furthermore, the light collector 10, in an embodiment, can advantageously be built from existing objects that are widely available and rather inexpensive in comparison with usual components of sunlight harnessing technologies.

For example, there exist many types of lamps having a reflector with the same shape as the light collector 10 illustrated in FIG. 3. The reflectors also have a socket adapted for receiving a lightbulb. Therefore, the light collector 10 can be manufactured by providing a reflector of a lamp and a lightbulb. The lightbulb can be built without the filament and with an aperture provided at the exit of its metallic socket. An optical fiber can be inserted into the bottom aperture of the lightbulb and secured therein (with adhesive or mechanical fixation means), while extending from the lightbulb for light transmission.

Figure 7A:
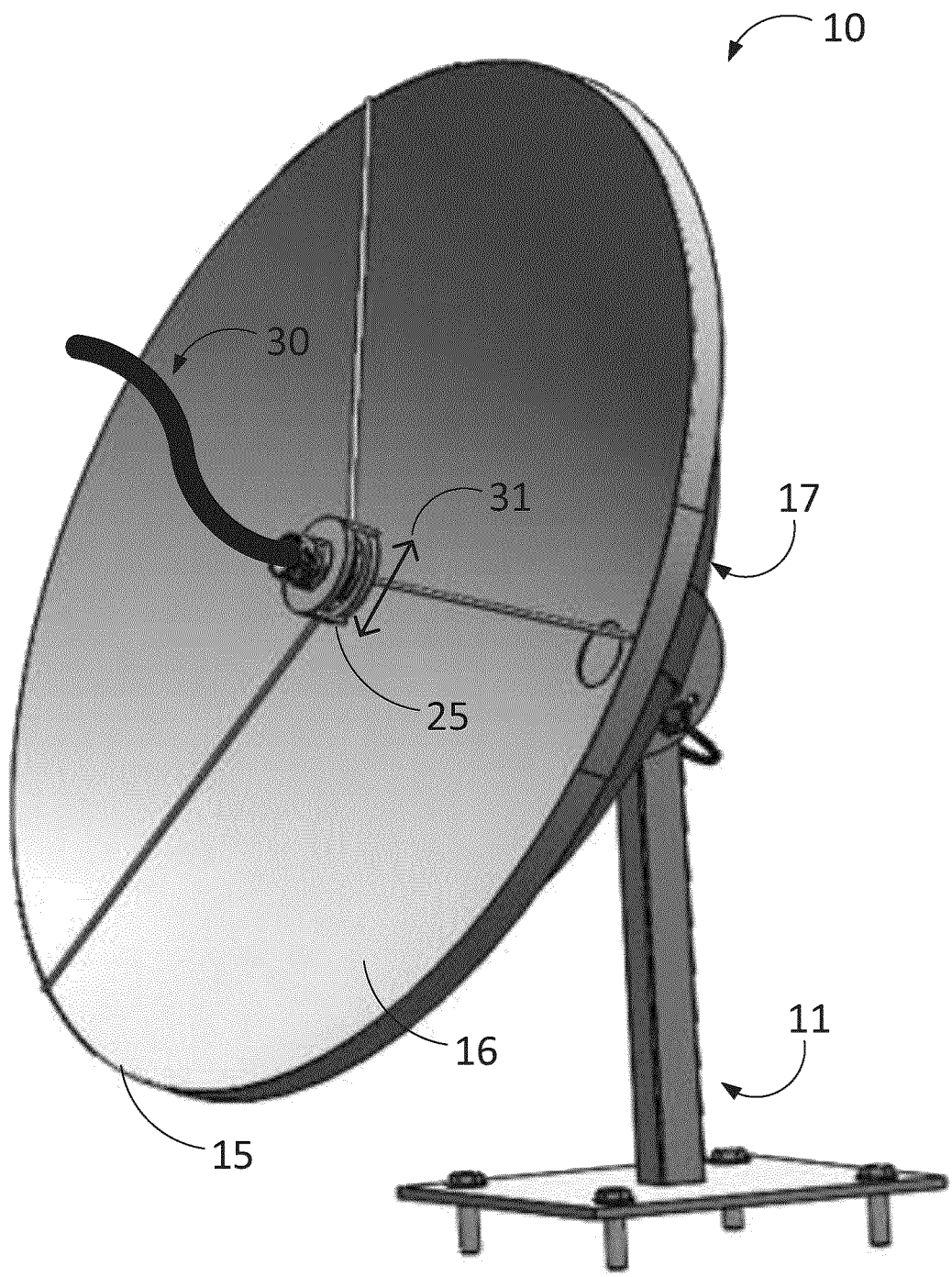
FIG. 7A is a perspective view illustrating of a light collector comprising a dish according to an embodiment.
Figure 7B:
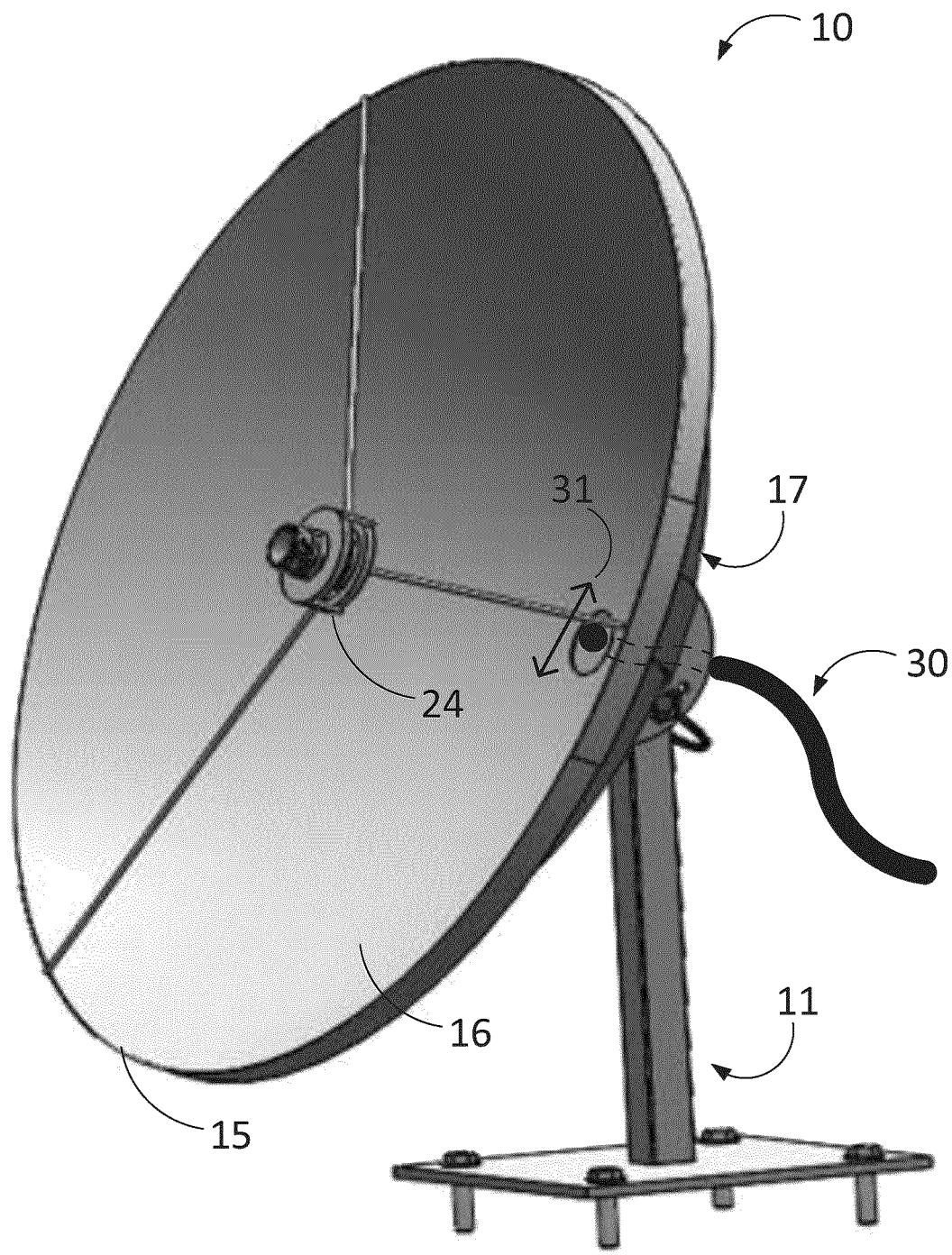
FIG. 7B is a perspective view illustrating of a light collector comprising a dish according to another embodiment.
Figure 9:
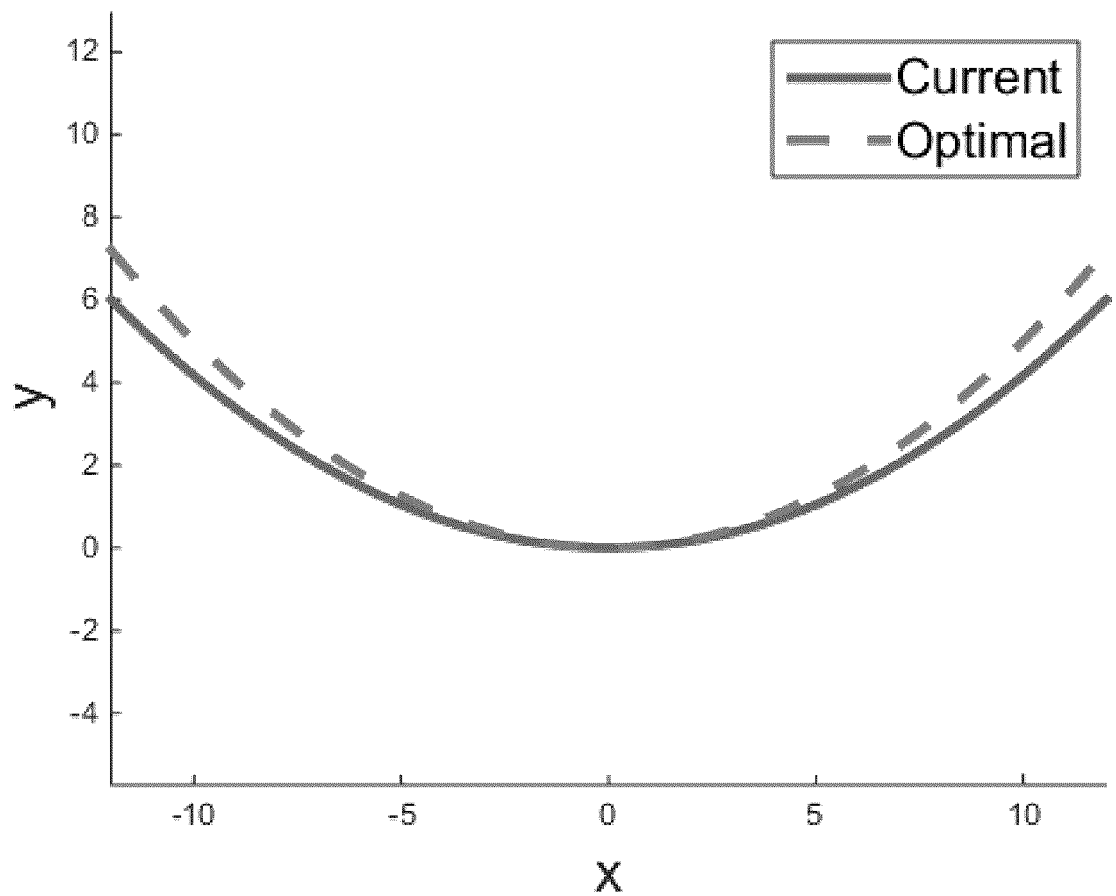
FIG. 9 is a graph illustrating an optimal parabola and a real parabola of an off-the-shelf dish, according to an embodiment.

Now referring to FIGS. 7A-7B and FIG. 9, there is shown another embodiment of a light collector 10. The embodiment shown in these figures shares many features with the embodiment described above. However, it differs in that the concave portion is not a lamp, but rather a dish. The dish is a large surface which is the revolution surface of a parabola, i.e., a paraboloid. Dishes do not provide the advantage of being off-the-shelf products such as lamp sockets. Their cost is thus higher, but this additional cost results in increased performance which makes this trade-off a sensible choice.

According to an embodiment, the dish has a diameter of 60 cm or 24 inches. The shape of the dish is preferably a paraboloid, i.e., a revolution surface of a parabola. The parabola may have a shape that depends on a variety of factors. For the contemplated purpose of collecting sunlight, a simulation may give an appropriate parabolic coefficient that gives high performance. For example, at a latitude of 45°, a simulation has shown that the parabola $y=x^2/20$, where both parameters are in inches, would provide a particularly advantageous paraboloid with respect to performance in light collection. This may of course be different from this value, as shown in FIG. 9. For example, off-the-shelf dishes can be found where the parabola would rather be expressed as $y=x^2/24$. Although suboptimal, this shape would still provide suitable performance.

According to an embodiment, the dish comprises a reflective coating applied onto the inner surface 16. Although advantageous for reflection purposes, the reflective coating may be hard to install or to maintain. According to another embodiment, the dish is rather chemically polished, mechanically polished and anodized (thereby resulting in a polished surface). This series of steps, when done properly, results in a high reflectivity of about 85%.

The dish can be heavy and thus needs an appropriate stand. The support 11 is shown in FIGS. 7A-7B and 8B. Advantageously, the support 11 is in steel or another material that is solid and that resists to rain and harsh weather.

Figure 8A:
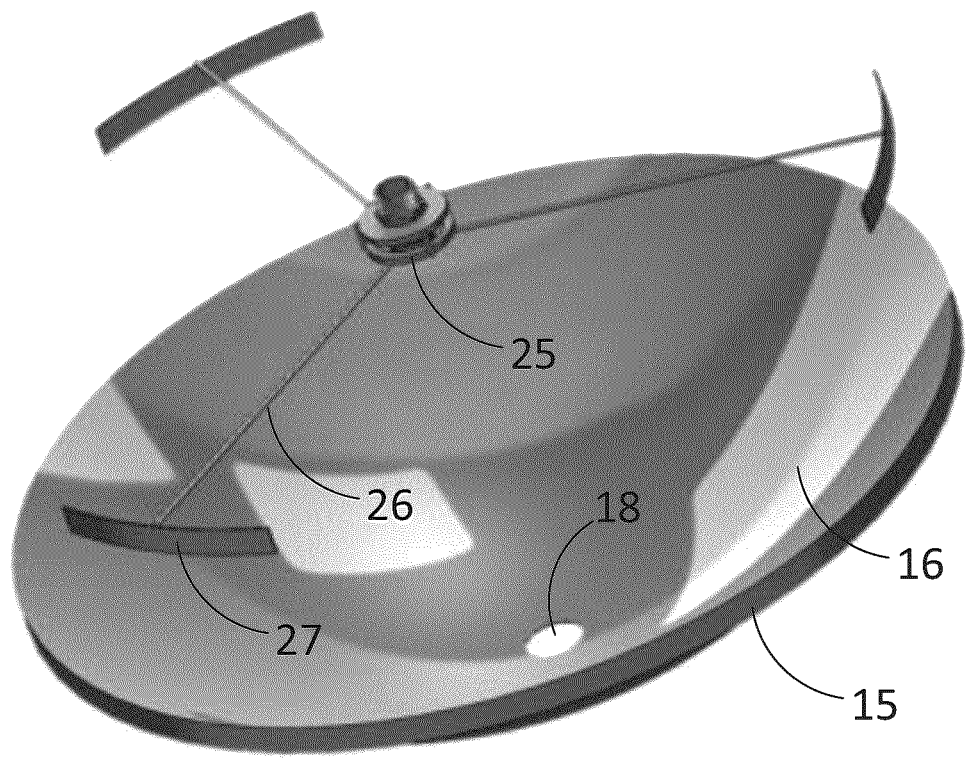
FIG. 8A is a perspective view illustrating the dish and the light capturing element of the light collector of FIGS. 7A-7B.
Figure 8B:
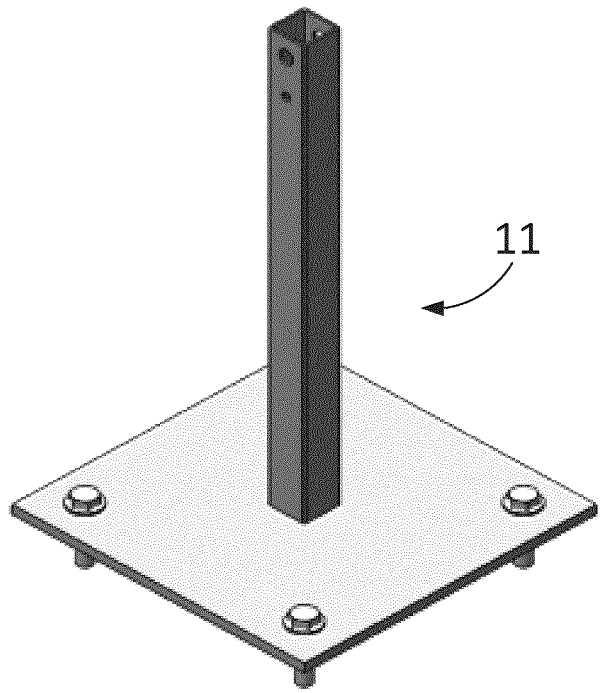
FIG. 8B is a perspective view illustrating the support of the light collector of FIGS. 7A-7B.
Figure 8C:
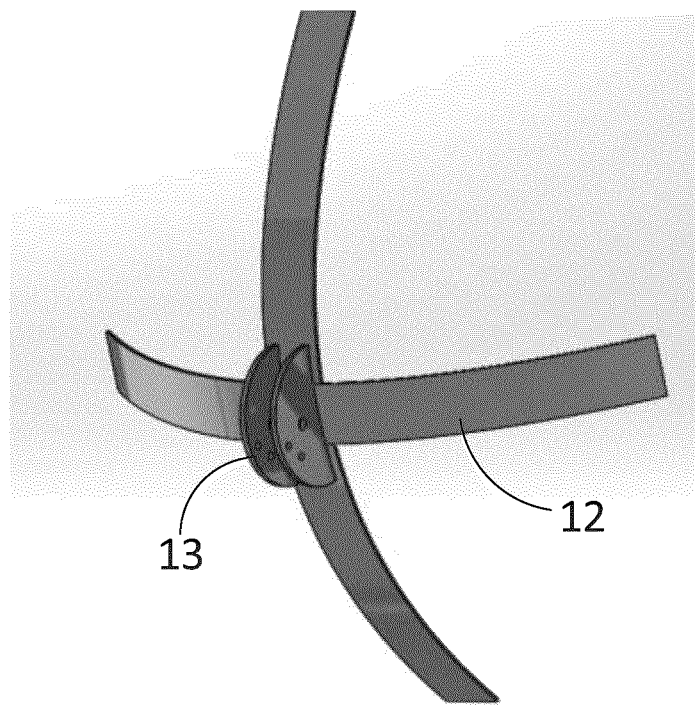
FIG. 8C is a perspective view illustrating the brackets for the dish of the light collector of FIGS. 7A-7B.
Figure 8D:
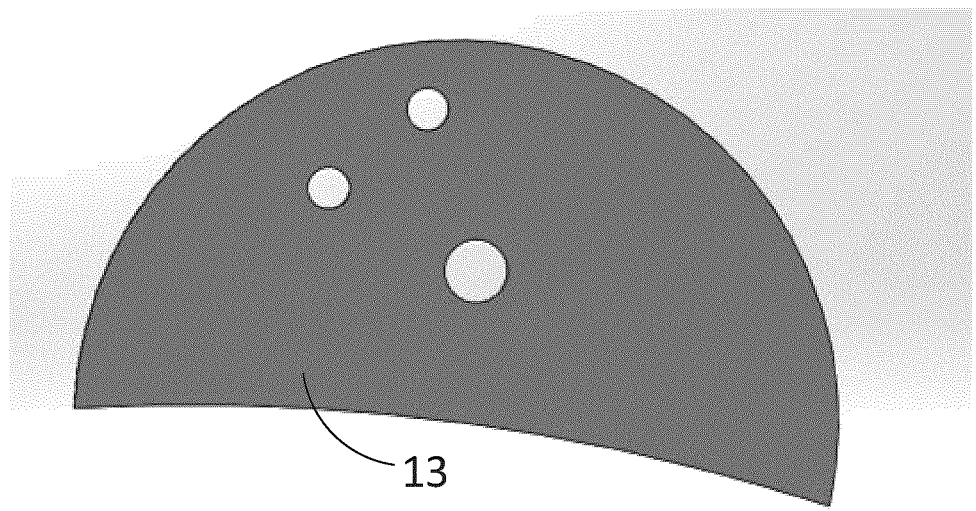
FIG. 8D is a top view illustrating the configuration brackets for the dish of the light collector of FIGS. 7A-7B.

According to an embodiment, the dish is supported on the support 11 by brackets, notably brackets 12 shown in FIG. 8C that fit with the outer surface 17 of the dish. Although soldering or fasteners can be contemplated as a means for fastening the dish to the brackets 12, the application of epoxy is preferable to avoid deformations that can happen over time or when there are temperature changes. The brackets 12 hold the dish and are themselves supported together by configuration brackets 13, shown in FIGS. 8C-8D, to which they can be fastened, glued or preferably welded for solidity. The configuration brackets 13 extend behind and away from the dish and, according to an exemplary embodiment, are adjustable in orientation. For example, they are shown as having a main hole by which a permanent pin can be inserted and serve as a hinge, and a pair of secondary holes where a removable pin can be removably and selectably inserted such that the hole in which the pin is inserted dictates the angular orientation of the brackets 12 and thus the dish. Therefore, the orientation of the dish can be easily adjusted, for example at season changes in which the pin is locked in a different position. The system required for such a change of orientation is easy to manufacture and does not incur substantial cost additions to the design.

According to an embodiment, the light guide 30 is an optical fiber. The optical fiber is preferably a multimode optical fiber having a large core in order to accept a substantially large range of incident angles of the incoming light rays onto the end surface of the optical fiber provided at the focal spot. An exemplary embodiment would comprise an optical fiber having a core diameter in the range of $10^{-2}$ m, for example 12.4 mm, which would be expected to provide a large range of acceptance, i.e., a large range of angles of incoming light rays onto the exposed end of the light guide that would be effectively guided, such as 80°. Various types of optical may be acceptable, such as a step-index fiber. Cables made up of a bundle of optical fibers would also be a possible implementation for the light guide.

The larger the light guide 30, the larger the light intensity of incident light that is effectively guided through the light guide 30, thereby improving performance. However, a large light guide is normally less flexible and thus harder to manipulate in the context of an easy-to-install and easy-to-maintain light collector. A light guide that would be too large would also affect the amount on the incoming sunlight, preventing it to reach the dish.

According an embodiment shown in FIG. 7B, there is provided a light-reflecting element 24 at the focal spot. This light-reflecting element 24 would be located at the focal spot and have a reflecting surface oriented toward the concave portion 15. In that case, the center of the dish would be pierced, e.g., the hole 18 at the exit at the center of the concave portion 15, to provide the light-receiving end of the light guide 30, as described above in reference with the embodiment shown in FIGS. 3-6.

This embodiment is advantageous in that the light guide 30 does not obstruct incoming sunlight. However, the light-reflecting element 24 at the focal spot may not redirect correctly the light reflected thereon toward the light-receiving end of the light guide 30, since the real-life focal spot is not a point. Since the focal point is in fact a focal spot, the light-reflecting element 24 may reflect light into a second focal spot that is expected to be at the light-receiving end of the light guide 30, but that is in fact and even more diffuse focal spot. If this problem arises because of the dish shape, it would be preferable to avoid the light-reflecting element 24.

There can thus be provided another embodiment as shown in FIGS. 7A and 8A. There is provided a light guide holder 25 at the focal spot. The light guide holder 25 can have an annular shape or any other shape suitable to hold the light guide 30. Light reflected by the inner surface 16 thus enters the light guide 30 directly, without any other secondary optics. This helps avoiding the problem of a focal spot becoming more diffuse at each reflection. The light guide holder 25 needs to be maintained at the focal spot. The holder arms 26 can be used for this purpose. The holder arms 26 are held by pads 27 that can urge onto the dish from the inside or more preferably hold the outside edge of the dish.

This embodiment has the light guide 30 partly obstruct the incoming sunlight. However, direct light entry into the light guide 30 at the first focal spot is advantageous for light collection efficiency.

It should be noted that the use of a light-reflecting element 24 at the focal spot or a light guide holder 25 would also apply to the embodiment shown in FIGS. 3-6 and not only to a dish. The use of arms 26 and pads 27 can also apply to the light-reflecting element 24.

The embodiment of the light collector 10 shown in FIGS. 7A-7B also illustrate that, optionally, a lens or lens arrangement 31 is provided in front of the light-receiving end of the light guide 30. The lens arrangement 31 therefore focuses the light reflected either from the concave portion 15 or the light-reflecting element 24 toward the light-receiving end of the light guide 30.

The light collector 10 thus manufactured, according to any of the embodiments presented above, can be mounted on a support 11 for installation at a location where there is light, such as a rooftop. The light guide 30 extends into the space under the roof (e.g., in the attic) and can be used for guiding light elsewhere. A coupler (not shown) may be used to connect another light guide for further guiding.

The guided light can be used for lighting (general lighting, task lighting, etc.), heating, or conversion to electricity by a photovoltaic cell. The lighting, heating and conversion to electricity can be performed anywhere permitted by the length of the light guide, usually inside the building.

The embodiments of a light collector described above are thus easy and cheap to build and maintain and can be built fast and in great number to supply lighting for buildings. The use of off-the-shelf components shortens the life cycle of product development and, notably, can advantageously be used in retrofitting.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A light collecting device comprising:
a concave portion for receiving incoming light and comprising a reflective inner surface for directing at least partly the incoming light toward a focal spot defined by a geometry of the concave portion;
a light capturing element, located at the focal spot, and having a lightbulb shape to substantially capture the incoming light directed toward the focal spot and to reflect the incoming light within the light capturing element toward an exit thereof, wherein the light capturing element is transparent, wherein a refraction index of the light capturing element is in a range ensuring substantial total inner reflection in order to reflect the incoming light within the light capturing element toward the exit; and
a light guide comprising an end provided at the exit of the light capturing element for guiding captured light outside of the light collecting device.

2. The light collecting device of claim 1, further comprising a lens arrangement in front of the end of the light guide.

3. A light collecting device comprising:
a concave portion for receiving incoming light and comprising a reflective inner surface for directing at least partly the incoming light toward a focal spot defined by a geometry of the concave portion; and
a light guide holder located at the focal spot for receiving a light-receiving end of a light guide at the focal spot, the light guide holder holding the light-receiving end at the focal spot and toward the concave portion to substantially capture the incoming light directed toward the focal spot.

4. The light collecting device of claim 3, wherein the concave portion comprises a dish.

5. The light collecting device of claim 4, wherein the dish comprises a paraboloid.

6. The light collecting device of claim 4, wherein the dish is held by brackets attached to an outer surface of the dish.

7. The light collecting device of claim 6, wherein the brackets are held to a support by a configuration bracket, the configuration bracket being lockable in more than one orientation.

8. The light collecting device of claim 4, wherein the light guide holder is held by arms which have pads to rest on or attach to the dish.

9. The light collecting device of claim 3, wherein the reflective inner surface comprises a polished surface.

10. The light collecting device of claim 3, further comprising the light guide.

11. The light collecting device of claim 3, further comprising a lens arrangement in front of the light-receiving end of the light guide.

12. A light collecting device comprising:
a concave portion for receiving incoming light and comprising a reflective inner surface for directing at least partly the incoming light toward a focal spot defined by a geometry of the concave portion, the concave portion having a reconfigurable orientation and having an exit formed by a hole in a bottom of the concave portion;
a light reflecting element, located at the focal spot, to substantially reflect toward the exit the incoming light that is directed toward the focal spot; and
a light guide comprising an end provided at the exit for guiding captured light outside of the light collecting device through the light guide, the end of the light guide occupying the hole of the exit and secured to the concave portion to be reorientable along with the concave portion.

13. The light collecting device of claim 12, wherein the concave portion comprises a dish.

14. The light collecting device of claim 13, wherein the dish comprises a paraboloid.

15. The light collecting device of claim 13, wherein the dish is held by brackets holding an outer surface of the dish.

16. The light collecting device of claim 15, wherein the brackets are held to a support by a configuration bracket, the configuration bracket being lockable in more than one orientation to provide the reconfigurable orientation of the concave portion along with the end of the light guide.

17. The light collecting device of claim 12, wherein the reflective inner surface comprises a polished surface.

18. The light collecting device of claim 12, further comprising a lens arrangement in front of the end of the light guide.

* * * * *